United States Patent
Puranam et al.

(10) Patent No.: US 10,403,911 B2
(45) Date of Patent: Sep. 3, 2019

(54) FLOW BATTERIES HAVING AN INTERFACIALLY BONDED BIPOLAR PLATE-ELECTRODE ASSEMBLY AND METHODS FOR PRODUCTION AND USE THEREOF

(71) Applicant: Lockheed Martin Energy, LLC, Bethesda, MD (US)

(72) Inventors: Srivatsava Venkataranga Puranam, Cambridge, MA (US); Timothy B. Grejtak, Boston, MA (US); Jeremy Loretz, Boston, MA (US); Thomas H. Madden, Glastonbury, CT (US); Joseph Johannes Henricus Pijpers, Cambridge, MA (US); Helen Elizabeth Vanbenschoten, Wakefield, MA (US); Curtis Warrington, Acton, MA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 5 days.

(21) Appl. No.: 15/289,063

(22) Filed: Oct. 7, 2016

(65) Prior Publication Data
US 2018/0102556 A1 Apr. 12, 2018

(51) Int. Cl.
*H01M 8/0297* (2016.01)
*H01M 8/0202* (2016.01)
(Continued)

(52) U.S. Cl.
CPC ....... *H01M 8/0297* (2013.01); *H01M 8/0202* (2013.01); *H01M 8/0234* (2013.01);
(Continued)

(58) Field of Classification Search
None
See application file for complete search history.

(56) References Cited

U.S. PATENT DOCUMENTS 3,779,813 A   12/1973  Rabut
4,075,401 A    2/1978  Miyagawa
(Continued)

FOREIGN PATENT DOCUMENTS

CN   103187551 A   7/2013
DE   10-2011-120802 A1   6/2013
(Continued)

OTHER PUBLICATIONS

Soloveichik, "Flow Batteries: Current Status and Trends," 2015, Chem. Rev., 115 (20), pp. 11533-11558.
(Continued)

Primary Examiner — Wyatt P McConnell
(74) Attorney, Agent, or Firm — BakerHostetler

(57) ABSTRACT

Electrochemical cells, such as those present within flow batteries, can have an electrode and a bipolar plate in at least one half-cell interfacially bonded together with an electrically conductive adhesive. Bonding the bipolar plate to the electrode can decrease contact resistance and sometimes lessen the incidence of parasitic reactions in the electrochemical cell. Flow batteries containing these features can include: a first half-cell containing a first electrode in interfacial contact with a first bipolar plate, a second half-cell containing a second electrode in interfacial contact with a second bipolar plate, and a separator disposed between the first half-cell and the second half-cell. An electrically conductive adhesive interfacially bonds at least one of the first electrode to the first bipolar plate and the second electrode to the second bipolar plate. Each electrode maintains fluid communication with its corresponding bipolar plate.

33 Claims, 6 Drawing Sheets

(51) Int. Cl.
*H01M 8/18* (2006.01)
*H01M 8/20* (2006.01)
*H01M 8/0234* (2016.01)
*H01M 8/0245* (2016.01)

(52) U.S. Cl.
CPC ......... *H01M 8/0245* (2013.01); *H01M 8/188* (2013.01); *H01M 8/20* (2013.01); *Y02E 60/528* (2013.01); *Y02P 70/56* (2015.11)

(56) References Cited

U.S. PATENT DOCUMENTS

| | | | |
|---|---|---|---|
| 4,532,193 | A | 7/1985 | Kniazzeh et al. |
| 4,735,872 | A | 4/1988 | Maimoni |
| 4,902,589 | A | 2/1990 | Dahn et al. |
| 4,948,681 | A | 8/1990 | Zagrodnik et al. |
| 5,188,911 | A | 2/1993 | Downing et al. |
| 5,618,641 | A | 4/1997 | Arias |
| 5,637,416 | A | 6/1997 | Yoshii et al. |
| 5,665,212 | A | 9/1997 | Zhong et al. |
| 6,296,746 | B1 | 10/2001 | Broman et al. |
| 7,229,564 | B2 | 6/2007 | Liu et al. |
| 8,268,475 | B2 | 9/2012 | Tucholski |
| 8,268,511 | B2 | 9/2012 | Mekala et al. |
| 9,443,782 | B1 | 9/2016 | Steimle et al. |
| 2003/0087141 | A1 | 5/2003 | Sun et al. |
| 2003/0087156 | A1 | 5/2003 | Broman et al. |
| 2003/0099884 | A1 | 5/2003 | Chiang et al. |
| 2004/0131916 | A1 | 7/2004 | Hodge et al. |
| 2004/0191623 | A1 | 9/2004 | Kubata et al. |
| 2004/0224190 | A1 | 11/2004 | Sasahara et al. |
| 2004/0233616 | A1 | 11/2004 | Arai et al. |
| 2005/0098435 | A1 | 5/2005 | Jacobson et al. |
| 2005/0158615 | A1 | 7/2005 | Samuel et al. |
| 2005/0260473 | A1 | 11/2005 | Wang |
| 2006/0068265 | A1 | 3/2006 | Hanlon et al. |
| 2007/0037037 | A1 | 2/2007 | Nguyen et al. |
| 2007/0054175 | A1 | 3/2007 | Maendle et al. |
| 2007/0125493 | A1 | 6/2007 | Jang et al. |
| 2007/0227654 | A1 | 10/2007 | Liu et al. |
| 2007/0287047 | A1 | 12/2007 | Kaiser et al. |
| 2008/0038622 | A1 | 2/2008 | Valensa et al. |
| 2008/0142152 | A1 | 6/2008 | Debe et al. |
| 2008/0152839 | A1 | 6/2008 | Han et al. |
| 2008/0291027 | A1 | 11/2008 | Lake |
| 2008/0305385 | A1 | 12/2008 | Smiljanich et al. |
| 2008/0318110 | A1 | 12/2008 | Budinski et al. |
| 2010/0003545 | A1 | 1/2010 | Horne et al. |
| 2010/0047650 | A1 | 2/2010 | Iino et al. |
| 2010/0260923 | A1* | 10/2010 | Pursley ............ A61M 25/0012 427/2.3 |
| 2010/0291442 | A1 | 11/2010 | Wang et al. |
| 2011/0223450 | A1 | 9/2011 | Horne et al. |
| 2011/0244277 | A1 | 10/2011 | Gordon, II et al. |
| 2012/0040254 | A1 | 2/2012 | Amendola et al. |
| 2012/0258345 | A1 | 10/2012 | Zaffou et al. |
| 2013/0037760 | A1 | 2/2013 | Maeda et al. |
| 2013/0071714 | A1 | 3/2013 | Perry et al. |
| 2013/0095361 | A1 | 4/2013 | Sinsabaugh et al. |
| 2013/0157097 | A1* | 6/2013 | Kampanatsanyakorn ............... H01M 8/188 429/105 |
| 2013/0266829 | A1 | 10/2013 | Cole et al. |
| 2014/0051007 | A1 | 2/2014 | Blanchet et al. |
| 2014/0234734 | A1 | 8/2014 | Tsutsumi et al. |
| 2014/0308594 | A1 | 10/2014 | Dudney et al. |
| 2014/0349147 | A1 | 11/2014 | Shaffer, II et al. |
| 2014/0370404 | A1 | 12/2014 | Kato et al. |
| 2015/0079493 | A1 | 3/2015 | Guthrie |
| 2015/0099199 | A1 | 4/2015 | Bazant et al. |
| 2015/0136301 | A1 | 5/2015 | Cyman, Jr. et al. |
| 2016/0020477 | A1 | 1/2016 | Smeltz et al. |
| 2016/0036060 | A1 | 2/2016 | Brezovec |
| 2016/0240868 | A1 | 8/2016 | Warrington et al. |
| 2016/0308224 | A1 | 10/2016 | Morris-Cohen et al. |
| 2017/0054164 | A1 | 2/2017 | Goeltz et al. |

FOREIGN PATENT DOCUMENTS

| | | |
|---|---|---|
| JP | H-06-290795 | 10/1994 |
| JP | 2001-283879 A | 10/2001 |
| JP | 2005-228633 A | 8/2005 |
| JP | 2008-047313 A | 2/2008 |
| JP | 2008-078104 A | 4/2008 |
| JP | 2008-091110 A | 4/2008 |
| JP | 2008-166260 A | 7/2008 |
| JP | 2011-228059 A | 11/2011 |
| JP | 2012-252955 A | 12/2012 |
| JP | 2014-520382 A | 8/2014 |
| WO | WO-00/16418 A1 | 3/2000 |
| WO | WO-2010/033118 A1 | 3/2010 |
| WO | WO-2012/177255 A1 | 12/2012 |

OTHER PUBLICATIONS

International Search Report and Written Opinion dated Jan. 26, 2017, which issued in International Application No. PCT/US16/57963.

International Search Report and Written Opinion dated Jan. 19, 2017, which issued in International Application No. PCT/US16/56672.

Extended European Search Report from European Patent Application No. 14845729.4, dated May 8, 2017.

International Search Report and Written Opinion from PCT/US2017/030452, dated Jul. 3, 2017.

Hollandsworth, et al., "Zinc/Ferricyanide Battery Development Phase IV," U.S. Department of Energy Report for Contract DE-AC04-76DP00789, May 1985, 278 pages.

Ma et al., "High-performance supercapacitor electrodes based on porous flexible carbon nanofiber paper treated by surface chemical etching," Chemical Engineering Journal, Aug. 2014.

McCreery, "Advanced Carbon Electrode Materials for Molecular Electrochemistry," Chem Rev, 2008, pp. 2646-2687, vol. 108.

Sen, et al., "Metal-Air Battery Assessment," U.S. Department of Energy Report for Contract DE-AC06-76RLO1830, May 1988, 84 pages.

Japanese Office Action from 2016-544047, dated Jul. 3, 2018, 11 pages.

* cited by examiner

FLOW BATTERIES HAVING AN INTERFACIALLY BONDED BIPOLAR PLATE-ELECTRODE ASSEMBLY AND METHODS FOR PRODUCTION AND USE THEREOF

CROSS-REFERENCE TO RELATED APPLICATIONS

Not applicable.

STATEMENT REGARDING FEDERALLY SPONSORED RESEARCH OR DEVELOPMENT

Not applicable.

FIELD

The present disclosure generally relates to energy storage and, more specifically, to modifications and techniques for improving the performance of flow batteries and related electrochemical systems.

BACKGROUND

Electrochemical energy storage systems, such as batteries, supercapacitors and the like, have been widely proposed for large-scale energy storage applications. Various battery designs, including flow batteries, have been considered for this purpose. Compared to other types of electrochemical energy storage systems, flow batteries can be advantageous, particularly for large-scale applications, due to their ability to decouple the parameters of power density and energy density from one another.

Flow batteries generally include negative and positive active materials in corresponding electrolyte solutions, which are flowed separately across opposing faces of a membrane or separator in an electrochemical cell containing negative and positive electrodes. The terms "membrane" and "separator" are used synonymously herein. The flow battery is charged or discharged through electrochemical reactions of the active materials that occur inside the two half-cells. As used herein, the terms "active material," "electroactive material," "redox-active material" or variants thereof synonymously refer to materials that undergo a change in oxidation state during operation of a flow battery or like electrochemical energy storage system (i.e., during charging or discharging).

Although flow batteries hold significant promise for large-scale energy storage applications, they have historically been plagued by sub-optimal energy storage performance (e.g., round trip energy efficiency) and limited cycle life, among other factors. Certain factors leading to sub-optimal performance are discussed hereinafter. Despite significant investigational efforts, no commercially viable flow battery technologies have yet been developed.

Balanced oxidation and reduction of the active materials in a flow battery are desirable electrochemical reactions, since they contribute to the battery's proper operation during charging and discharging cycles. Such reactions may be referred to herein as "productive reactions."

In addition to desirable productive reactions, undesirable parasitic reactions can also occur within one or both half-cells of flow batteries and related electrochemical systems. As used herein, the term "parasitic reaction" refers to any side electrochemical reaction that takes place in conjunction with productive reactions. Parasitic reactions can often involve a component of an electrolyte solution that is not the active material. Electrochemical reactions of an active material that render the active material unable to undergo reversible oxidation and reduction can also be considered parasitic in nature. Parasitic reactions that can commonly occur in electrochemical cells containing an aqueous electrolyte solution are evolution of hydrogen and/or oxidation by oxygen. Hydrogen evolution, for example, can at least partially discharge the negative electrolyte solution of an electrochemical cell. Related parasitic reactions can also occur in non-aqueous electrolyte solutions.

Discharge associated with parasitic reactions can decrease the operating efficiency and other performance parameters of a flow battery. In addition, parasitic reactions can change the pH of an electrolyte solution, which can destabilize the active material therein in some cases. In the case of a parasitic reaction that occurs preferentially in one half-cell over the other, an imbalance in state of charge can result between the negative and positive electrolyte solutions. The term "state of charge" (SOC) is a well understood electrochemical energy storage term that refers herein to the relative amounts of reduced and oxidized species at an electrode within a given half-cell of an electrochemical system. Charge imbalance between the electrolyte solutions of a flow battery can lead to mass transport limitations at one or both of the electrodes, thereby lowering the round-trip operating efficiency. Since the charge imbalance can be additive with each completed charge and discharge cycle, increasingly diminished performance of a flow battery can result due to parasitic reactions.

Charge rebalancing of one or both electrolyte solutions can be conducted to combat the effects of parasitic reactions. Although various charge rebalancing techniques are available, they can be costly and time-consuming to implement. Determining the true concentration of oxidized and reduced active material species in an electrolyte solution can oftentimes itself be difficult, thereby adding a further difficulty to the charge rebalancing process. While charge rebalancing of an electrolyte solution can often be accomplished given sufficient diligence, the accompanying pH changes can frequently be much more difficult to address.

Bipolar plates are often used in flow batteries and related electrochemical systems to place adjacent electrochemical cells in electrical communication with one another in an electrochemical stack. Contact resistance at an interface of a bipolar plate with another conductive surface can create another source of operating inefficiency, particularly when additive contributions from each electrochemical cell in an electrochemical stack are taken into account. As used herein, the term "contact resistance" refers to the contribution to the total resistance of an electrical system arising from an interface between two conductive surfaces. In particular, contact resistance at the interface between an electrode and a bipolar plate in an electrochemical cell can often produce a significant fraction of the total cell resistance. Monopolar plates can be used similarly and present like issues, and the term "bipolar plate" refers synonymously to a "monopolar plate" herein.

Contact resistance in an electrochemical cell can conventionally be lowered by applying a compressive force between a bipolar plate and an electrode. Although improving contact between the bipolar plate and the electrode, thereby lowering the contact resistance, the compressive force can also at least partially compact a porous or fibrous electrode and decrease the available electrode volume (i.e., porosity) for circulation of an electrolyte solution therethrough. Volume decreases of 20%-50% are common in conventional electrochemical cell fabrication processes. Electrode compaction can result in undesirable pressure buildup in the electrochemical cell during operation, as well as decrease the available surface area upon which electrochemical reactions can occur. Mass transfer resistance resulting from electrode compaction can often offset the improvement in contact resistance otherwise gained.

In view of the foregoing, flow batteries and other electrochemical systems configured to decrease the incidence of parasitic reactions, contact resistance, and other performance-reducing factors would be highly desirable in the art. The present disclosure satisfies the foregoing needs and provides related advantages as well.

SUMMARY

In some embodiments, the present disclosure provides flow batteries including a first half-cell containing a first electrode in interfacial contact with a first bipolar plate, a second half-cell containing a second electrode in interfacial contact with a second bipolar plate, and a separator disposed between the first half-cell and the second half-cell. An electrically conductive adhesive interfacially bonds at least one of the first electrode to the first bipolar plate and the second electrode to the second bipolar plate. Fluid communication is maintained between the first electrode and the first bipolar plate and between the second electrode and the second bipolar plate.

In other various embodiments, the present disclosure provides methods for producing an electrochemical cell having an interfacially bonded electrode. Such methods can include: fabricating an electrochemical cell containing a first half-cell containing a first electrode, a second half-cell containing a second electrode, and a separator disposed between the first half-cell and the second half-cell; interfacially contacting the first electrode with a first bipolar plate; interfacially contacting the second electrode with a second bipolar plate; and forming at least one interfacial adhesive bond with an electrically conductive adhesive between the first electrode and the first bipolar plate or between the second electrode and the second bipolar plate. Fluid communication is maintained between the first electrode and the first bipolar plate and between the second electrode and the second bipolar plate after interfacial adhesive bond formation.

In still other various embodiments, the present disclosure describes methods for operating a flow battery having an interfacially bonded electrode in at least one half-cell. Such methods can include: providing a flow battery having an electrochemical cell containing a first half-cell containing a first electrode in interfacial contact with a first bipolar plate, a second half-cell containing a second electrode in interfacial contact with a second bipolar plate, and a separator disposed between the first half-cell and the second half-cell, and circulating a first electrolyte solution through the first half-cell and a second electrolyte solution through the second half-cell. An electrically conductive adhesive interfacially bonds at least one of the first electrode to the first bipolar plate and the second electrode to the second bipolar plate. Fluid communication is maintained between the first electrode and the first bipolar plate and between the second electrode and the second bipolar plate. Convective flow of at least one of the first electrolyte solution and the second electrolyte solution occurs preferentially in a region of the first electrode or the second electrode opposite an interfacial adhesive bond formed with the electrically conductive adhesive.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
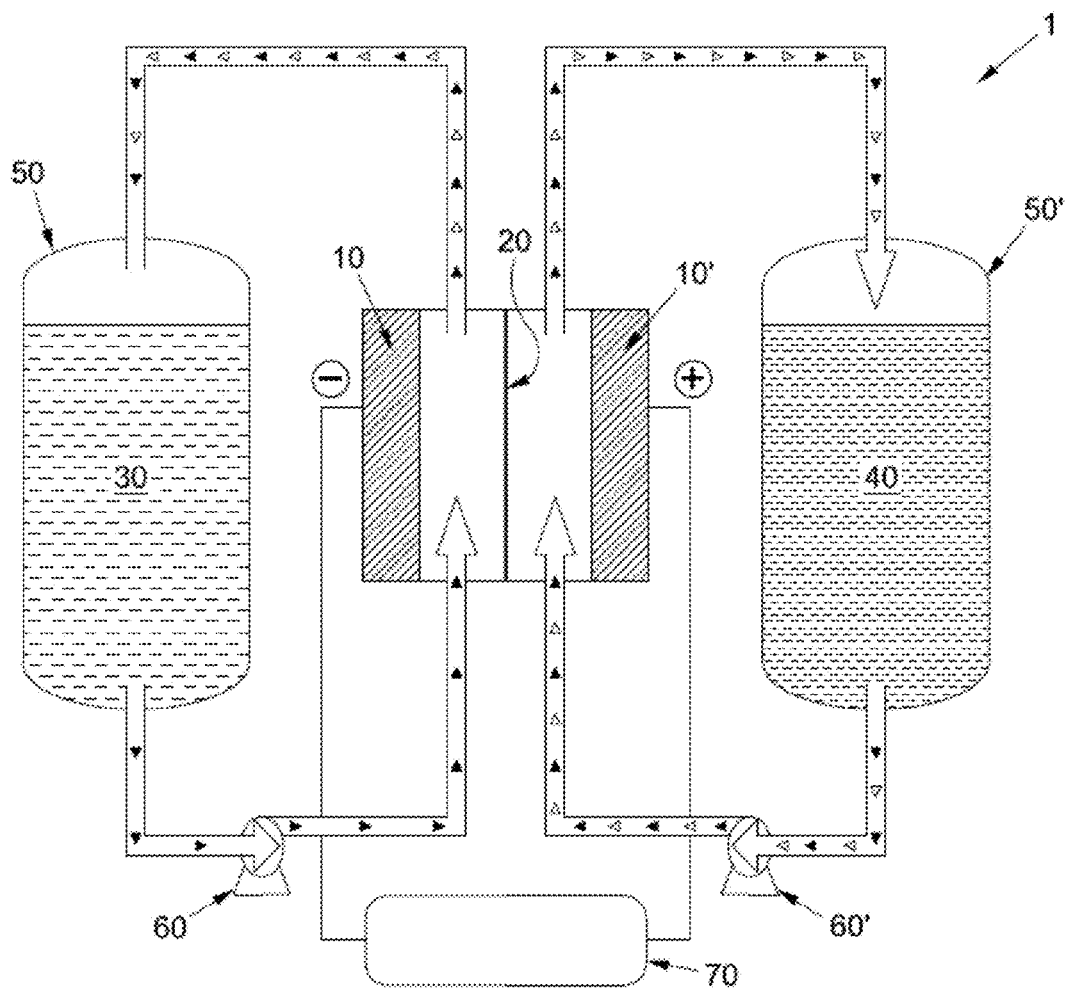
FIG. 1 shows a schematic of an illustrative flow battery containing a single electrochemical cell.

The present disclosure is directed, in part, to flow batteries having at least one electrode that is interfacially bonded to a bipolar plate with an electrically conductive adhesive, thereby forming a bipolar plate-electrode assembly. The present disclosure is also directed, in part, to methods for producing an electrochemical cell having at least one electrode that is interfacially bonded to a bipolar plate with an electrically conductive adhesive, as well as methods for forming flow batteries therefrom. The present disclosure is also directed, in part, to methods for improving the operating performance of flow batteries and related electrochemical systems by utilizing at least one electrode that is interfacially bonded to a bipolar plate with an electrically conductive adhesive.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein. Further, the terminology used herein is for purposes of describing particular embodiments by way of example only and is not intended to be limiting unless otherwise specified. Similarly, unless specifically stated otherwise, any description herein directed to a composition is intended to refer to both solid and liquid versions of the composition, including solutions and electrolytes containing the composition, and electrochemical cells, flow batteries, and other energy storage systems containing such solutions and electrolytes. Further, it is to be recognized that where the disclosure herein describes an electrochemical cell, flow battery, or other energy storage system, it is to be appreciated that methods for operating the electrochemical cell, flow battery, or other energy storage system are also implicitly described.

It is also to be appreciated that certain features of the present disclosure may be described herein in the context of separate embodiments for clarity purposes, but may also be provided in combination with one another in a single embodiment. That is, unless obviously incompatible or specifically excluded, each individual embodiment is deemed to be combinable with any other embodiment(s) and the combination is considered to represent another distinct embodiment. Conversely, various features of the present disclosure that are described in the context of a single embodiment for brevity's sake may also be provided separately or in any sub-combination. Finally, while a particular embodiment may be described as part of a series of steps or part of a more general structure, each step or sub-structure may also be considered an independent embodiment in itself.

Unless stated otherwise, it is to be understood that each individual element in a list and every combination of individual elements in that list is to be interpreted as a distinct embodiment. For example, a list of embodiments presented as "A, B, or C" is to be interpreted as including the embodiments "A," "B," "C," "A or B," "A or C," "B or C," or "A, B, or C."

In the present disclosure, the singular forms of the articles "a," "an," and "the" also include the corresponding plural references, and reference to a particular numerical value includes at least that particular value, unless the context clearly indicates otherwise. Thus, for example, reference to "a material" is a reference to at least one of such materials and equivalents thereof.

In general, use of the term "about" indicates approximations that can vary depending on the desired properties sought to be obtained by the disclosed subject matter and is to be interpreted in a context-dependent manner based on functionality. Accordingly, one having ordinary skill in the art will be able to interpret a degree of variance on a case-by-case basis. In some instances, the number of significant figures used when expressing a particular value may be a representative technique of determining the variance permitted by the term "about." In other cases, the gradations in a series of values may be used to determine the range of variance permitted by the term "about." Further, all ranges in the present disclosure are inclusive and combinable, and references to values stated in ranges include every value within that range.

As discussed above, energy storage systems that are operable on a large scale while maintaining high efficiency values can be extremely desirable. Flow batteries have generated significant interest in this regard, but there remains considerable room for improving their operating characteristics. In particular, parasitic reactions and contact resistance represent two factors that can significantly impact the operating efficiency in conventional flow battery designs.

Parasitic reactions can be exceedingly detrimental to the performance of flow batteries and other electrochemical systems. At the very least, parasitic reactions can create an imbalance in state of charge between the two electrolyte solutions of a flow battery, which can impact the battery's performance over time and repeated cycles of charging and discharging. In addition, parasitic reactions can lead to undesirable changes in the pH of one or more of the electrolyte solutions, which can degrade some types of active materials. In conventional flow battery designs, parasitic reactions can be difficult to manage due to a number of operational issues.

Contact resistance can also be significant in flow batteries, particularly when connecting multiple electrochemical cells together in an electrochemical stack. Whereas resistance is a fixed property of a given material, contact resistance varies depending on the type and geometry of the interface that is present between two surfaces. A leading source of contact resistance within an electrochemical stack can occur at the interface between a bipolar plate and an electrode in a given electrochemical cell, since different materials are often used for forming the bipolar plate and the electrode, and the area of contact between the two is frequently low. For example, in some instances, a bipolar plate can be formed from a graphite block and an electrode can be formed from carbon fibers or porous carbon foam, thereby leading to contact resistance between the compositionally and morphologically differing surfaces. The contact resistance arising at the interface between abutted bipolar plates is often much less. In view of the large number of individual cells and interfaces that can be present in an electrochemical stack, even small contact resistance contributions to the overall cell resistance can aggregate to a large value. Regardless of its source, increased resistance within a flow battery or other electrochemical system can undesirably impact operating performance and economic viability.

In conventional flow battery designs and fabrication processes, contact resistance is typically addressed by applying a compressive force between a bipolar plate and an electrode. As discussed above, application of a compressive force can at least partially compact a porous or fibrous electrode and decrease the available electrode volume, thereby leading to increased mass transfer resistance and other operational issues. The mass transfer resistance resulting from electrode compaction can often offset the improvement in contact resistance otherwise gained.

Given the foregoing issues associated with electrode compaction, the present inventors sought ways to decouple contact resistance and mass transfer resistance from one another during fabrication and operation of electrochemical cells. Surprisingly, the inventors discovered a simple modification to conventional electrochemical cells designs that can allow such decoupling to be realized. Even more surprisingly, by implementing the electrochemical cell modifications described herein, the inventors found that parasitic reactions can be addressed simultaneously. Advantageously, the electrochemical cell modifications described herein can be readily implemented at various stages of the manufacturing processes utilized for forming the electrochemical cells.

More specifically, the inventors discovered that by forming an interfacial adhesive bond between a bipolar plate and an electrode in an electrochemical cell of a flow battery or similar electrochemical system, decreased contact resistance can result. Such interfacial adhesive bonding can be implemented readily at various manufacturing stages for an electrochemical cell, and continuous manufacturing processes can be facilitated in some instances. An electrically conductive adhesive can be used to form the interfacial adhesive bond, thereby maintaining good electrical communication between the bipolar plate and the electrode. The electrically conductive adhesive effectively decreases the porosity of the electrode in the vicinity of a contact interface with the bipolar plate, which lessens contact resistance in a similar manner to that achieved by electrode compaction. Since the porosity decrease is localized in the case of using an electrically conductive adhesive, minimal changes in mass transport resistance accompany the decreased contact resistance. Moreover, the electrically conductive adhesive can be chosen to lessen compositional variance between the bipolar plate and the electrode, which can further aid in decreasing the contact resistance. A number of electrically conductive adhesives are known in the art and can be suitably applied in the various embodiments described herein.

Forming an interfacial adhesive bond between an electrode and a bipolar plate effectively introduces a density gradient into the electrode. Specifically, the electrode is denser in proximity to the interface with the bipolar plate and less dense in other locations. As a result of the lower electrode density at locales removed from the bipolar plate, convective flow of the electrolyte solution is preferentially shunted into those lower density regions. Accordingly, increased electrolyte flow in closer proximity to the separator occurs in the electrochemical cell, particularly when providing the electrolyte solution to the electrode from a plurality of flow channels within the bipolar plate. Again, decreased mass transfer resistance can result from this feature.

The inventors also surprisingly discovered that the incidence of productive reactions in an electrochemical cell increases in close proximity to the separator. Thus, by increasing convective flow of the electrolyte solution nearer the separator, the overall percentage of parasitic reactions can be lessened. The decreased pore space located away from the separator also provides a smaller electrode surface area for parasitic reactions to take place. Accordingly, forming an interfacial adhesive bond to decrease contact resistance directly leads to a cell architecture that is favorable for addressing parasitic reactions as well.

The electrochemical cells described herein are particularly advantageous with respect to parasitic reactions, since conventional cell designs offer no appreciable mechanism for minimizing the occurrence of parasitic reactions other than by changing the cell's operating conditions such that an overpotential for parasitic reactions is not exceeded and/or by changing the cell's chemical composition altogether. By changing an electrochemical cell in this manner, however, desired productive reactions of an active material may not occur at all, or they may not occur with sufficient rapidity. Thus, changing the operating conditions of a flow battery or other electrochemical system to mitigate parasitic reactions can be an untenable approach in many circumstances. The electrochemical cells of the present disclosure address these issues while simultaneously decreasing contact resistance.

Before discussing further specifics of the electrochemical cells of the present disclosure, illustrative flow battery configurations and their operating characteristics will first be described in greater detail hereinafter. Unlike typical battery technologies (e.g., Li-ion, Ni-metal hydride, lead-acid, and the like), where active materials and other components are housed in a single assembly, flow batteries transport (e.g., via pumping) redox-active energy storage materials from storage tanks through an electrochemical stack containing one or more electrochemical cells. This design feature decouples the electrical energy storage system power from the energy storage capacity, thereby allowing for considerable design flexibility and cost optimization. FIG. 1 shows a schematic of an illustrative flow battery containing a single electrochemical cell. Although FIG. 1 shows a flow battery containing a single electrochemical cell, approaches for combining multiple electrochemical cells together are known and are discussed hereinbelow.

As shown in FIG. 1, flow battery system 1 includes an electrochemical cell that features separator 20 between electrodes 10 and 10' of the electrochemical cell. As used herein, the terms "separator" and "membrane" refer to an ionically conductive and electrically insulating material disposed between the positive and negative electrodes of an electrochemical cell. The two terms are used synonymously herein. Electrodes 10 and 10' are formed from a suitably conductive material, such as a metal, carbon, graphite, and the like, and the materials for two can be the same or different. Although FIG. 1 has shown electrodes 10 and 10' as being spaced apart from separator 20, electrodes 10 and 10' can also be abutted with separator 20 in more particular embodiments (see FIG. 2 below). The material(s) forming electrodes 10 and 10' can be porous, such that they have a high surface area for contacting the electrolyte solutions containing first active material 30 and second active material 40, which are capable of being cycled between an oxidized state and a reduced state. For example, one or both of electrodes 10 and 10' can be formed from a porous carbon cloth or a carbon foam in some embodiments.

Pump 60 affects transport of first active material 30 from tank 50 to the electrochemical cell. The flow battery also suitably includes second tank 50' that contains second active material 40. Second active material 40 can be the same material as first active material 30, or it can be different. Second pump 60' can affect transport of second active material 40 to the electrochemical cell. Pumps can also be used to affect transport of active materials 30 and 40 from the electrochemical cell back to tanks 50 and 50' (not shown in FIG. 1). Other methods of affecting fluid transport, such as siphons, for example, can also suitably transport first and second active materials 30 and 40 into and out of the electrochemical cell. Also shown in FIG. 1 is power source or load 70, which completes the circuit of the electrochemical cell and allows a user to collect or store electricity during its operation.

It should be understood that FIG. 1 depicts a specific, non-limiting configuration of a particular flow battery. Accordingly, flow batteries consistent with the spirit of the present disclosure can differ in various aspects relative to the configuration of FIG. 1. As one example, a flow battery system can include one or more active materials that are solids, gases, and/or gases dissolved in liquids. Active materials can be stored in a tank, in a vessel open to the atmosphere, or simply vented to the atmosphere.

As indicated above, multiple electrochemical cells can also be combined with one another in an electrochemical stack in order to increase the rate that energy can be stored and released during operation. The amount of energy released is determined by the overall amount of active material that is present. An electrochemical stack utilizes bipolar plates between adjacent electrochemical cells to establish electrical communication but not fluid communication between the two cells. Thus, bipolar plates contain the electrolyte solutions within the individual electrochemical cells. Bipolar plates are generally fabricated from electrically conductive materials that are fluidically non-conductive between adjacent cells. Suitable materials can include, for example, carbon, graphite, metal, or a combination thereof. Bipolar plates can also be fabricated from non-conducting polymers having a conductive material dispersed therein, such as carbon particles or fibers, metal particles or fibers, graphene, and/or carbon nanotubes. Although bipolar plates can be fabricated from the same types of conductive materials as can the electrodes of an electrochemical cell, they can lack the continuous porosity permitting an electrolyte solution to flow completely through the latter. It should be recognized, however, that bipolar plates are not necessarily entirely non-porous entities, however. Bipolar plates can have innate or designed flow channels that provide a greater surface area for an electrolyte solution to contact the bipolar plate and to distribute the electrolyte solution to the electrochemical cell. Suitable flow channel configurations can include, for example, interdigitated flow channels (see FIG. 3). Delivery of an electrolyte solution to an electrode via a bipolar plate is discussed in more detail hereinbelow.

Figure 2:
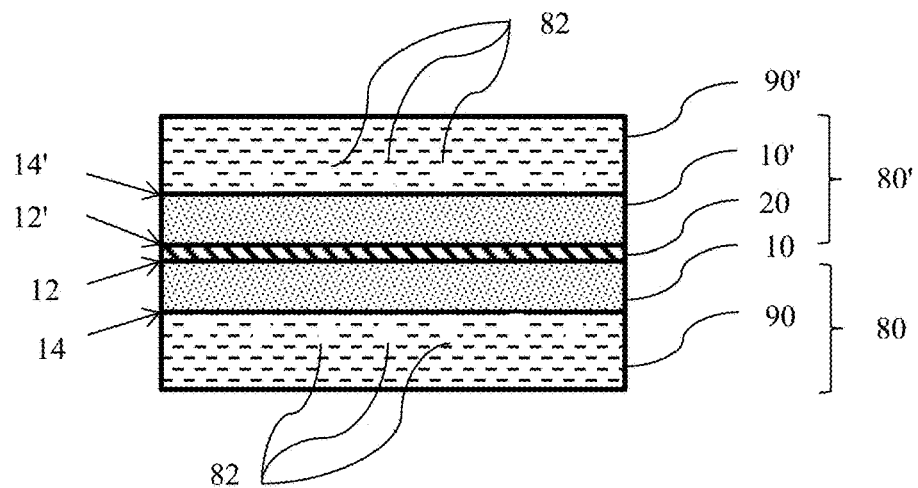
FIG. 2 shows a schematic of an illustrative electrochemical cell configuration containing a bipolar plate abutting each electrode.
Figure 3:
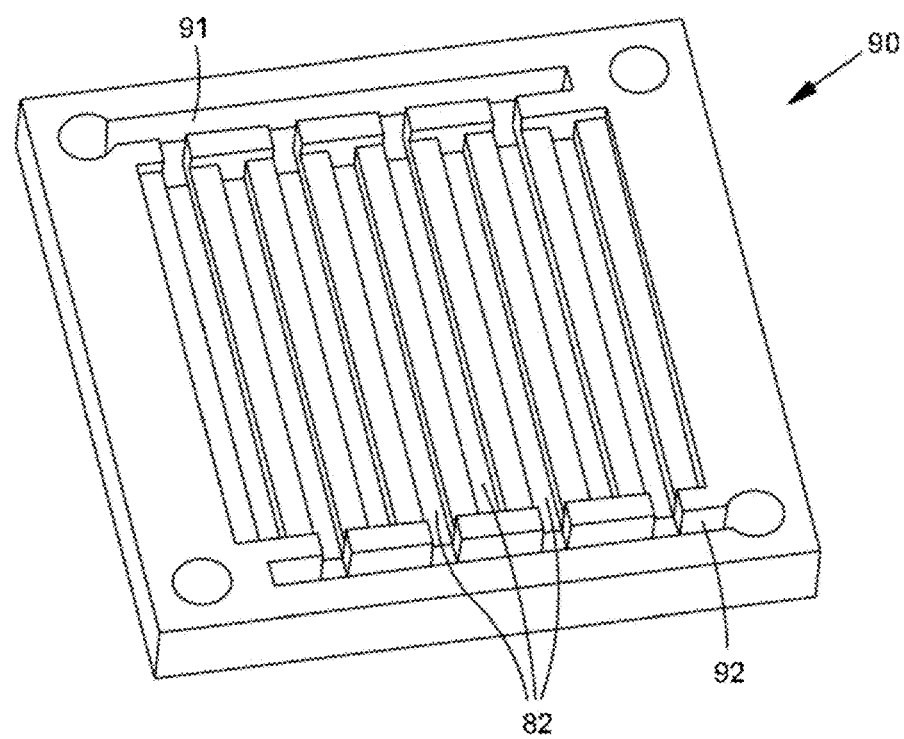
FIG. 3 shows an illustrative schematic of a bipolar plate containing interdigitated flow channels.

FIG. 2 shows a schematic of an illustrative electrochemical cell configuration containing a bipolar plate abutting each electrode. Where appropriate, common reference characters will be used to describe elements shown in a preceding FIGURE. Referring to FIG. 2, negative half-cell 80 and positive half-cell 80' are disposed on opposing sides of separator 20. Negative half-cell 80 contains electrode 10 (i.e., the anode) abutted with separator 20 at interface 12, and bipolar plate 90 is, in turn, abutted against the opposing face of electrode 10 at interface 14. Positive half-cell 80' similarly contains electrode 10' (i.e., the cathode) abutted with the opposing face of separator 20 at interface 12', and bipolar plate 90' is, in turn, abutted against the opposing face of electrode 10' at interface 14'. Flow channels 82 extend partially within the interior of bipolar plates 90 and 90' and increase the degree of contact with the electrolyte solution. In some embodiments, flow channels 82 can be in an interdigitated configuration as shown in FIG. 3 below. Other configurations for flow channels include, for example, regular or irregular spacing, random directionality, tortuous interconnected pathways, random distributions and/or gradient distributions. In the interest of clarity, the fluid flow details shown in FIG. 1 are not presented in FIG. 2. However, it can be readily appreciated how the electrochemical cell configuration of FIG. 2 would be incorporated in FIG. 1, or how a plurality of electrochemical cells would be incorporated an electrochemical stack and connected to a fluid distribution manifold to deliver an electrolyte solution. For example, a fluid distribution manifold can be connected to an inlet on bipolar plates 90 and 90' to supply an electrolyte solution to electrodes 10 and 10', as shown hereinafter. For purposes of discussion herein, the electrochemical cell configuration of FIG. 2 will be considered representative of that present in a conventional flow battery.

FIG. 3 shows an illustrative schematic of a bipolar plate containing interdigitated flow channels. As shown in FIG. 3, bipolar plate 90 includes inlet channel 91 and outlet channel 92, and flow channels 82 are interdigitated with one another in between. Thus, a fluid distribution manifold (not shown) can be connected to inlet channel 91 to supply an electrolyte solution to alternating flow channels 82. After interacting with electrode 10, the electrolyte solution can migrate via convective flow to flow channels 82 beside those that are initially filled with electrolyte solution, and the electrolyte solution then exits bipolar plate 90 via outlet channel 92.

Advantageously, the electrochemical cell modifications described herein do not represent a dramatic change over conventional cell architectures or require drastically altered manufacturing processes. In fact, the modifications described herein can allow continuous manufacturing processes to be realized, including reel-to-reel continuous manufacturing processes using rolled materials. Instead of applying a high compressive force as in conventional electrochemical cell manufacturing processes, a much gentler force can be supplied to promote adhesive bonding between a bipolar plate and an electrode when utilizing an electrically conductive adhesive. As a result, the electrode volume and overall porosity decrease to a much lesser degree, while still introducing a beneficial porosity gradient therein. Improved mass transport resistance can result from maintaining the overall electrode porosity and shunting convective flow toward the separator. The electrically conductive adhesive can be introduced at several points in time during electrochemical cell manufacturing processes and at various locations upon the electrochemical cells, as described hereinafter. Either or both of the electrodes in an electrochemical cell can be adhered to their corresponding bipolar plate via an interfacial adhesive bond, depending upon whether one wants to decrease parasitic reactions and contact resistance in one or both of the half-cells.

Accordingly, in various embodiments, flow batteries of the present disclosure can include a first half-cell containing a first electrode in interfacial contact with a first bipolar plate, a second half-cell containing a second electrode in interfacial contact with a second bipolar plate, and a separator disposed between the first half-cell and the second-half-cell. An electrically conductive adhesive interfacially bonds at least one of the first electrode to the first bipolar plate and the second electrode to the second bipolar plate, such that fluid communication is maintained between the first electrode and the first bipolar plate and between the second electrode and the second bipolar plate. The electrically conductive adhesive effectively increases the electrode density/decreases the electrode porosity in proximity to the electrode's interface with the bipolar plate. As discussed above, the increased electrode density/decreased electrode porosity in this location can increase convective flow of the electrolyte solution nearer the separator, thereby increasing the incidence of productive reactions and decreasing the incidence of parasitic reactions, decreasing contact resistance between the electrode and the bipolar plate, and lessening mass transfer resistance. By remaining in fluid communication with their respective electrodes, the first and second bipolar plates can be configured to distribute an electrolyte solution to the first and second half-cells, respectively.

Depending on the particular half-cell in which one wants to mitigate the incidence of parasitic reactions and/or decrease contact resistance, one or both of the electrodes can be adhesively bonded to the corresponding bipolar plate. In some embodiments, the electrodes in both the first half-cell and the second half-cell can be adhesively bonded to the corresponding bipolar plate. In other embodiments, the first electrode in the first half-cell can be adhesively bonded to the first bipolar plate, and the second electrode in the second half-cell can be abutted with but not adhesively bonded to the second bipolar plate (i.e., be unmodified). The first electrode can be either the anode or the cathode. In the drawings that follow, both electrodes will be depicted and described as being adhesively bonded to their corresponding bipolar plate, but it is to be recognized that the electrodes and bipolar plates can be modified individually as well. Modification of the electrode and bipolar plate in the negative half-cell of a flow battery or similar electrochemical device can be especially desirable, since the pH changes accompanying parasitic generation of hydrogen can be particularly detrimental.

Figure 4:
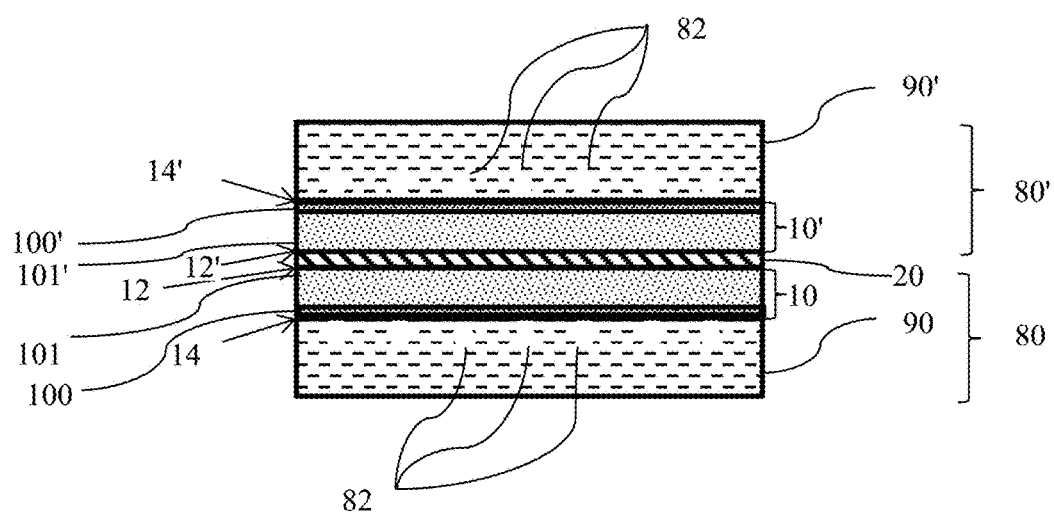
FIG. 4 shows a schematic of an illustrative electrochemical cell configuration in which the electrodes are interfacially bonded to their corresponding bipolar plate with an electrically conductive adhesive.

FIG. 4 shows a schematic of an illustrative electrochemical cell configuration in which the electrodes are interfacially bonded to their corresponding bipolar plate with an electrically conductive adhesive. As shown in FIG. 4, electrode 10 includes high-density region 100 in proximity to bipolar plate 90 and low-density region 101 in proximity to separator 20. Similarly, high-density region 100' and low-density region 101' are located within electrode 10'. In some instances, high-density regions 100 and 100' can arise through infusion of the electrically conductive adhesive into the pores defined in electrodes 10 and 10' in proximity to interfaces 14 and 14'. Thus, electrodes 10 and 10' are rendered compositionally and morphologically heterogeneous through infusion of an electrically conductive adhesive thereto. In other instances, electrodes 10 and 10' can be rendered compositionally and morphologically heterogeneous when the electrically conductive adhesive resides upon the face of electrodes 10 and 10' opposite of separator 20, in which case the protruding electrically conductive adhesive effectively becomes part of electrodes 10 and 10'. Other than incorporating an electrically conductive adhesive and forming interfacial adhesive bonds at interfaces 14 and 14', the electrochemical cell configuration of FIG. 4 is identical to that of FIG. 2 and may be better understood by reference thereto.

FIGS. 5A-5E show illustrative schematics demonstrating differences in fluid flow dynamics in the absence and in the presence of an electrode that is adhesively bonded to a bipolar plate. In the interest of clarity, FIGS. 5A-5E show only show a single half-cell, but it is to be recognized that the concepts of these FIGURES can be easily extended to both half-cells in a flow battery, if desired. FIGS. 5B-5E show various illustrative manners in which an electrically conductive adhesive can be incorporated in the embodiments of the present disclosure.

Figure 5A:
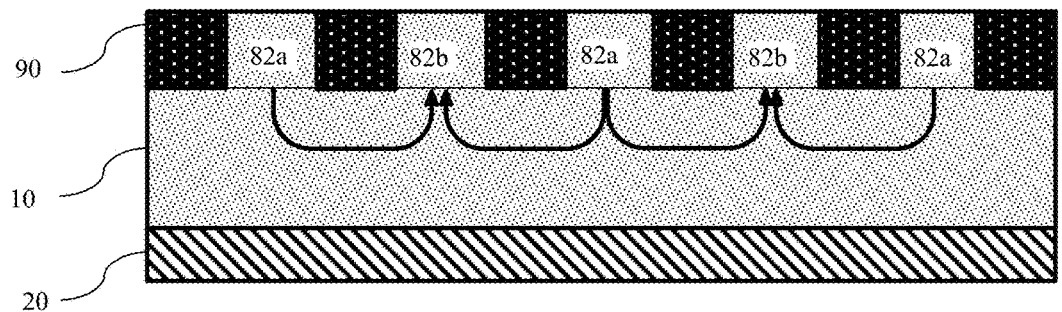
FIGS. 5A-5E show illustrative schematics demonstrating differences in fluid flow dynamics in the absence and in the presence of an electrode that is adhesively bonded to a bipolar plate.

FIG. 5A shows a half-cell of a flow battery in which electrode 10 abuts bipolar plate 90 but is not adhesively bonded thereto. The configuration of FIG. 5A is to be considered representative of conventional flow battery half-cells, in which electrode compaction takes place (compaction not depicted in FIG. 5A in the interest of clarity). As shown in FIG. 5A, an electrolyte solution is supplied to electrode 10 through bipolar plate 90, which contains flow channels 82a and 82b in an interdigitated layout. Specifically, the electrolyte solution enters through flow channels 82a, penetrates some distance into electrode 10, and then exits through flow channels 82b. Since electrode 10 is substantially homogeneous in FIG. 5A, the penetration depth of the electrolyte solution is relatively small, and only a minimal fraction of the electrolyte solution nears separator 20 under convective flow conditions in order for productive reactions to take place.

In contrast, FIGS. 5B-5E show half-cells of a flow battery in which an electrically conductive adhesive is present at the interface between electrode 10 and bipolar plate 90. As indicated above, the electrically conductive adhesive renders electrode 10 heterogeneous in terms of its density, porosity, composition and morphology. As a result, electrode 10 can form a more effective interface with bipolar plate 90. Specifically, the electrically conductive adhesive produces high-density region 100 (i.e., lower porosity) adjacent to bipolar plate 90 and low-density region 101 (i.e., higher porosity) adjacent to separator 20. That is, high-density region 101 is sandwiched between separator 20 and low-density region 100. As in the configuration of FIG. 5A, the electrolyte solution enters through flow channels 82a, penetrates some distance into electrode 10 and then exits through flow channels 82b. In the cell configurations of FIGS. 5B-5E, however, the penetration depth of the electrolyte solution is much deeper and closer to separator 20 due to the presence of the electrically conductive adhesive in proximity to bipolar plate 90, thereby leading to a decreased incidence of parasitic reactions.

Figure 5B:
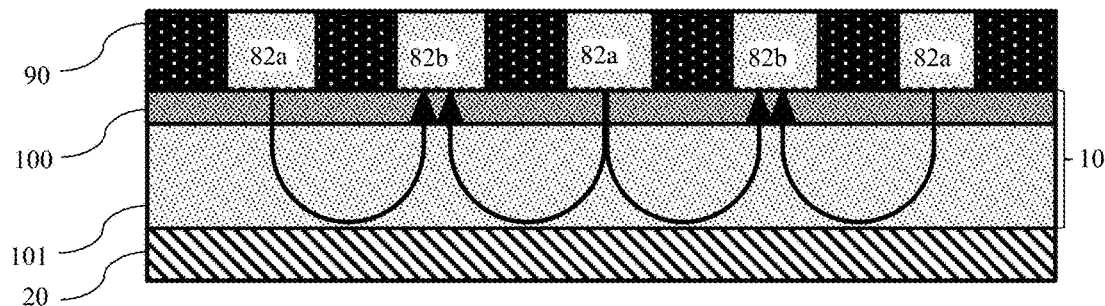
Figure 5C:
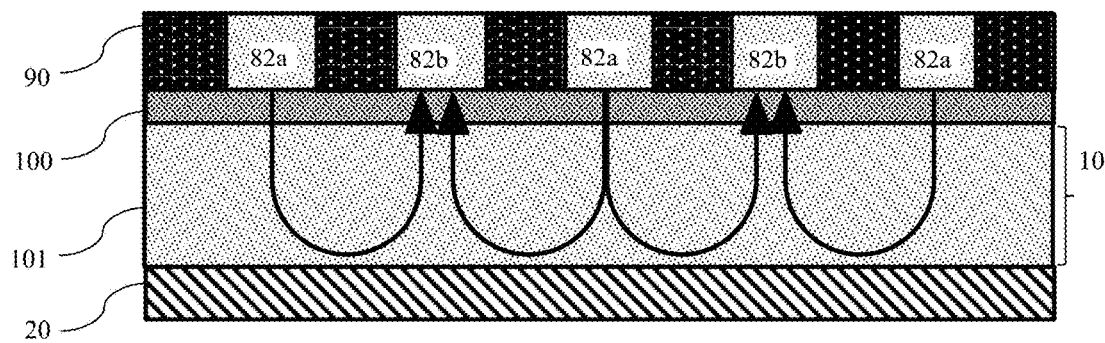

FIGS. 5B and 5C show high-density region 100 as being a substantially continuous layer extending over the entire interfacial span between electrode 10 and bipolar plate 90. Even continuous layers of the type depicted in FIGS. 5B and 5C can maintain sufficient porosity to allow convective flow of the electrolyte solution to be maintained from bipolar plate 90. Continuous layers of the type depicted in FIGS. 5B and 5C can be produced, in some embodiments, through spreading or spraying an electrically conductive adhesive upon the surface of electrode 10. In some instances, at least a portion of the electrically conductive adhesive can penetrate into pores defined in electrode 10 (FIG. 5B). This configuration can be more ideal for improving contact resistance in many situations. In other instances, the electrically conductive adhesive remains upon the face of electrode 10 opposite separator 20 (FIG. 5C). Either configuration can maintain fluid communication between electrode 10 and bipolar plate 90, while simultaneously promoting deeper convective flow of the electrolyte solution toward separator 20. For example, the electrically conductive adhesive can occlude pores in electrode 10 nearer bipolar plate 90 and direct flow of the electrolyte solution toward separator 20 as a result.

Figure 5D:
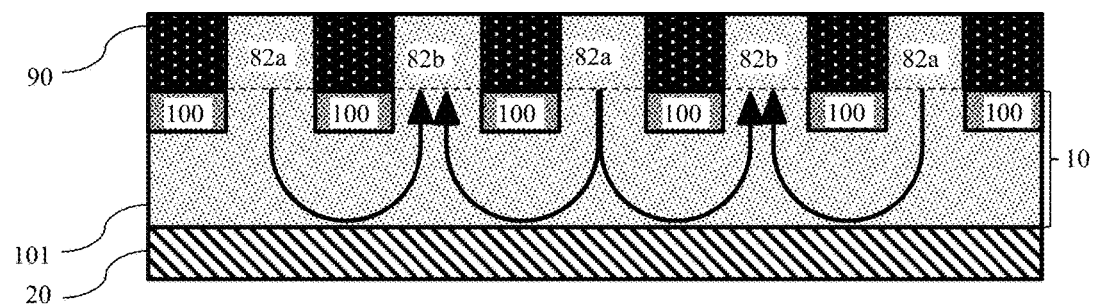
Figure 5E:
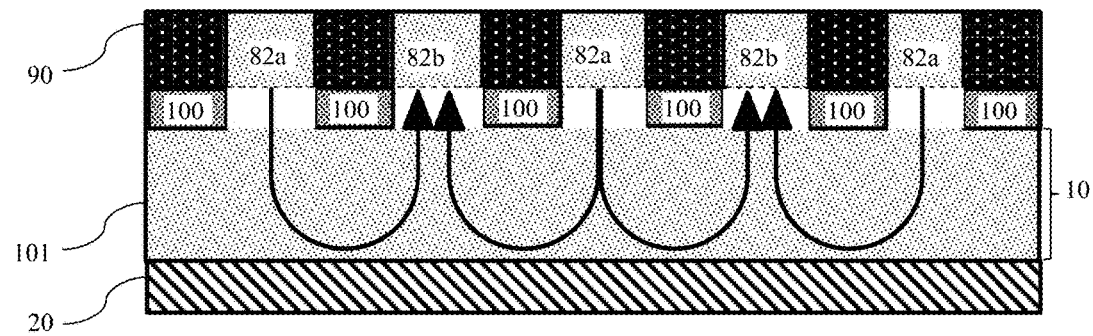

In contrast, FIGS. 5D and 5E show high-density region 100 as being a discontinuous layer in the interfacial span between electrode 10 and bipolar plate 90. FIG. 5D shows a discontinuous layer in which the electrically conductive adhesive is present in the pores defined in electrode 10. This configuration effectively extends flow channels 82a and 82b of bipolar plate 90 deeper into electrode 10 by limiting the lateral flow of the electrolyte solution. An advantage of this configuration is that there is no direct pore occlusion below flow channels 82a and 82b. A discontinuous layer of the type depicted in FIG. 5D can be realized through controlled placement of the electrically conductive adhesive upon either electrode 10 or bipolar plate 90 and then allowing penetration of the electrically conductive adhesive to occur prior to or in conjunction with forming an interfacial adhesive bond with bipolar plate 90. The configuration of FIG. 5D is similar to that of FIG. 5B and can be better understood through reference thereto. FIG. 5E, in contrast, shows a discontinuous layer situated upon the face of electrode 10 opposite separator 20, which is similar to the configuration of FIG. 5C. A discontinuous layer of the type shown in FIG. 5E can similarly be produced through controlled placement of the electrically conductive adhesive upon either electrode 10 or bipolar plate 90. In some embodiments, a discontinuous layer of the type shown in FIG. 5E can be produced through application of decal containing a contact adhesive to electrode 10 or bipolar plate 90. Decal application to bipolar plate 90 can be particularly desirable, since flow channel alignment upon an electrode-applied decal can be difficult in some instances.

Figure 6:
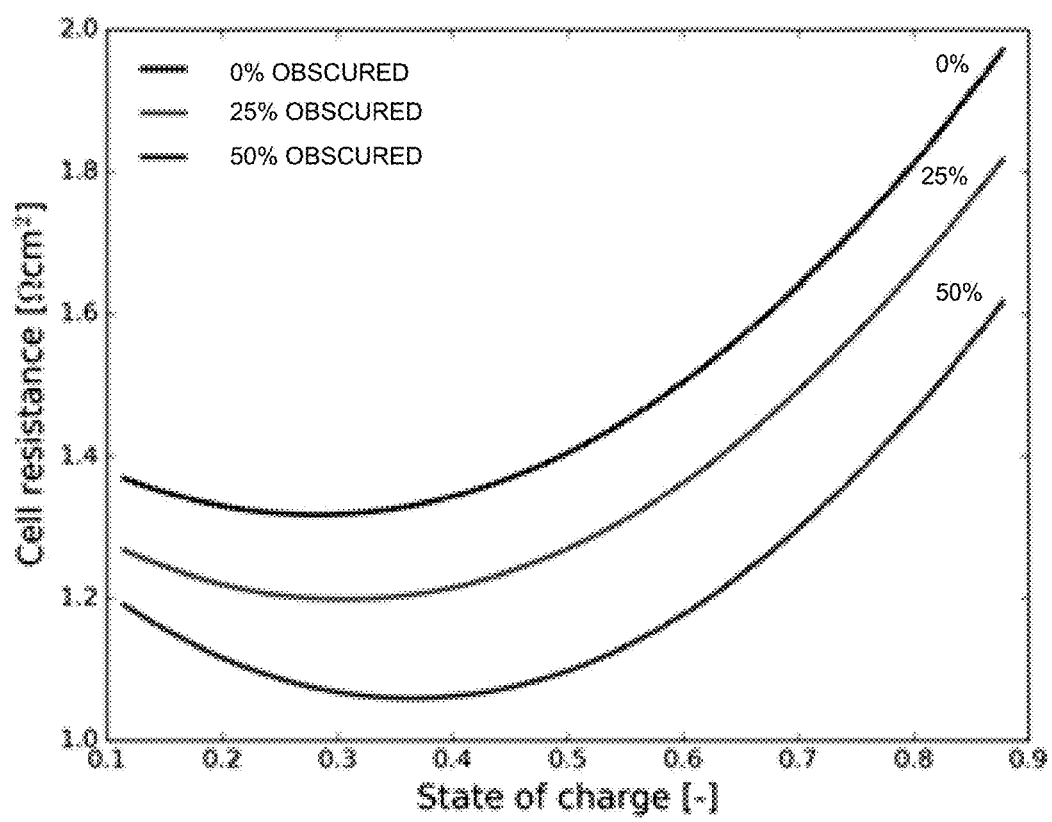
FIG. 6 shows a comparative plot of calculated cell resistance as a function of state of charge for electrodes that are partially obscured by varying amounts of an electrically conductive adhesive.

FIG. 6 shows a comparative plot of calculated cell resistance as a function of state of charge for electrodes that are partially obscured by varying amounts of an electrically conductive adhesive. As shown in FIG. 6, greater amounts of electrically conductive adhesive lowered the overall cell resistance at all states of charge. According to FIG. 6, if the adhesive properties can be controlled such that penetration into the electrodes occurs to a desired degree, an overall reduction in cell resistance can be realized through improvement in mass transport. Improved contact resistance can also be realized, thereby lowering the overall cell resistance, because of the increase in total surface area between the bipolar plate and the electrode as a result of the electrically conductive adhesive being present.

As indicated above, various types of electrically conductive adhesives can be employed in the embodiments of the present disclosure. The particular type of electrically conductive adhesive can be varied depending upon where it is disposed within the electrochemical cell and the point at which it is incorporated in the electrochemical cell manufacturing process. Both thermosetting polymers and epoxy-type adhesives can be suitable in the various embodiments of the present disclosure. In general, suitable electrically conductive adhesives are free of metals and have a resistivity value of less than about 10 Ohm cm. In addition, the electrically conductive adhesive can be chosen such that it has chemical compatibility with the electrolyte solution(s) present in the electrochemical cell.

In some embodiments, the electrically conductive adhesive can be an epoxy, particularly a carbon-based epoxy. Numerous examples of epoxy-based electrically conductive adhesives are known. In general, electrically conductive adhesives that are classified as epoxies include a curable polymer base and a plurality of electrically conductive particles dispersed therein. The electrically conductive particles can include, for example, graphite particles, graphite flakes, graphite fibers, carbon black, carbon nanotubes, graphene, metal carbide particles (e.g., TiC or WC), or any combination thereof. In some embodiments, the electrically conductive adhesive can contain about 50% to about 80% electrically conductive particles by weight, and the particle size can range between about 0.1 micron and about 30 microns. Both self-curing epoxies (i.e., one-part epoxies) and two-part epoxies can be used in the various embodiments of the present disclosure. The technique through which an epoxy is applied to the bipolar plate(s) or the electrode(s) is not considered to be particularly limited. Some illustrative examples of suitable application techniques are discussed elsewhere herein. For example, the viscosity of the epoxy can dictate a suitable application technique to the bipolar plate and/or the electrode and the timing for its application during a manufacturing process. Typical epoxies suitable for use in the embodiments of the present disclosure can have pre-curing viscosity values ranging between about 100 Poise and about 1000 Poise.

In other embodiments, the electrically conductive adhesive can be a thermosetting polymer. Suitable thermosetting polymers can include, for example, polyurethanes, polyamides, and the like. Similar electrically conductive particles at comparable loading values can again be present when a thermosetting polymer is used as the electrically conductive adhesive.

In other various embodiments, the electrically conductive adhesive can be a contact adhesive disposed on a surface of any of the electrode(s) or the bipolar plate(s). The contact adhesive can be in the form of a decal, in some embodiments. As indicated above, application of a decal to a bipolar plate can be particularly desirable, since it can be easier to match the decal pattern to the flow channel pattern on the bipolar plate, rather than aligning the bipolar plate with a decal initially applied to the surface of an electrode.

In still other various embodiments, at least one of the first electrode and the second electrode can be a prepreg of the electrically conductive adhesive. Specifically, in a prepreg, the electrically conductive adhesive can be loaded in an uncured or partially cured state within the porosity of the electrode, possibly in a pattern to match the flow channels in the bipolar plate. Thereafter, the resulting prepreg electrode and the bipolar plate can be mated with one another, and curing of the electrically conductive adhesive can be completed to form the interfacial adhesive bond between the electrode and the bipolar plate.

In some or other more particular embodiments, at least one of the first electrode and the second electrode can include a carbon cloth that is interfacially bonded to the first bipolar plate or the second bipolar plate via the electrically conductive adhesive. As indicated above, at least a portion of the electrically conductive adhesive can fill pores in a carbon cloth in some embodiments of the present disclosure, thereby leading to formation of an interfacial adhesive bond and less contact resistance than when the electrode is simply abutted with a bipolar plate. Suitable carbon cloths are not considered to be particularly limited. Other porous electrode materials such as carbon foams and the like can similarly have an electrically conductive adhesive infiltrated therein.

In some embodiments, the electrically conductive adhesive can include one or more surfactants that are added thereto. Surfactant addition to the electrically conductive adhesive can decrease surface tension and viscosity of the electrically conductive adhesive and promote infiltration into the pores of the electrode(s). Suitable surfactants are not considered to be particularly limited, provided that they do not detrimentally impact the operation of the flow battery and/or prevent proper curing of the electrically conductive adhesive from occurring.

Materials for forming the bipolar plates used in the various embodiments of the present disclosure are not considered to be particularly limited, other than having sufficient electrical conductivity to establish electrical communication between adjacent cells in an electrochemical stack and chemical compatibility with the electrolyte solutions. Cost and ease of machining to produce a desired shape or flow channel geometry can also be considerations for choosing a particular material over another. In more specific embodiments, the bipolar plate(s) can be formed from a graphite block. The bipolar plate(s) can have a plurality of flow channels defined therein, such as a plurality of interdigitated flow channels, which establish fluid communication with the electrode(s) to deliver an electrolyte solution thereto.

In some or other embodiments, the flow channels in a bipolar plate can be substantially devoid of the electrically conductive adhesive. In some embodiments, the flow channels can be kept substantially free of the electrically conductive adhesive through precision deposition techniques. Other suitable techniques for keeping the flow channels substantially devoid of the electrically conductive adhesive are also discussed herein.

In various embodiments, the electrochemical cells disclosed herein can be incorporated in flow batteries, flow battery electrochemical stacks or similar electrochemical systems. Exemplary flow battery configurations are discussed in more detail hereinabove. Other electrochemical systems in which the electrochemical cells of the present disclosure can be applicable include, for example, electrolyzers and fuel cell systems.

Accordingly, methods for decreasing the incidence of parasitic reactions and/or contact resistance within a flow battery are implicitly described herein. In various embodiments, such methods can include: providing a flow battery having an electrochemical cell including a first half-cell containing a first electrode in interfacial contact with a first bipolar plate, a second half-cell containing a second electrode in interfacial contact with a second bipolar plate, and a separator disposed between the first half-cell and the second half-cell, and circulating a first electrolyte solution through the first half-cell and a second electrolyte solution through the second half-cell. An electrically conductive adhesive interfacially bonds at least one of the first electrode to the first bipolar plate and the second electrode to the second bipolar plate, with fluid communication being maintained between the first electrode and the first bipolar plate and between the second electrode and the second bipolar plate. Convective flow of at least one of the first electrolyte solution and the second electrolyte solution occurs preferentially in a region of the first electrode or the second electrode opposite an interfacial adhesive bond formed with the electrically conductive adhesive. In more specific embodiments, the first electrolyte solution and the second electrolyte solution can be circulated through a plurality of flow channels within the first bipolar plate contacting the first electrode and the second bipolar plate contacting the second electrode (see FIGS. 3 and 5B-5D).

In further embodiments, a plurality of the electrochemical cells can be connected in series with one another in an electrochemical stack. The bipolar plates from adjacent electrochemical cells can abut one another, or a bipolar plate can be shared between adjacent electrochemical cells in other embodiments.

In related embodiments, methods for fabricating an electrochemical cell having at least one electrode with an interfacial adhesive bond to a bipolar plate are also described herein. The methods can include: fabricating an electrochemical cell containing a first half-cell containing a first electrode, a second half-cell containing a second electrode, and a separator disposed between the first half-cell and the second half-cell; interfacially contacting the first electrode with a first bipolar plate; interfacially contacting the second electrode with a second bipolar plate; and forming at least one interfacial adhesive bond with an electrically conductive adhesive between the first electrode and the first bipolar plate or between the second electrode and the second bipolar plate. Fluid communication is maintained between the first electrode and the first bipolar plate and between the second electrode and the second bipolar plate after interfacial adhesive bond formation takes place. In further embodiments, both the first electrode and the second electrode can be adhesively bonded to their corresponding bipolar plates. The electrochemical cells can be incorporated in a flow battery or flow battery electrochemical stack in more specific embodiments.

In further embodiments, the methods for fabricating the electrochemical cells can include introducing the electrically conductive adhesive at an interface between the first electrode and the first bipolar plate and/or at an interface between the second electrode and the second bipolar plate. Various techniques are available for introducing the electrically conductive adhesive at the interface, as discussed in brief above.

In more specific embodiments, the methods can include applying the electrically conductive adhesive to a portion of at least one of the first electrode and the second electrode, and then interfacially contacting the first bipolar plate or the second bipolar plate therewith. Suitable application techniques can include, for example, spraying or printing the electrically conductive adhesive onto the electrode, optionally allowing the electrically conductive adhesive to penetrate into the porosity of the electrode, and contacting the bipolar plate with the electrode. After curing of the electrically conductive adhesive, an interfacial adhesive bond can be formed between the electrode and the bipolar plate.

In other more specific embodiments, the methods can include applying the electrically conductive adhesive to a portion of at least one of the first bipolar plate and the second bipolar plate, and then interfacially contacting the first electrode or the second electrode therewith. In still more specific embodiments, the electrically conductive adhesive can be applied to the first bipolar plate or the second bipolar plate, such that the flow channels are substantially devoid of the electrically conductive adhesive. Suitable deposition techniques can include precision deposition techniques such as, for example, robotic or similar deposition techniques that are capable of depositing the electrically conductive adhesive on the face of the bipolar plate (i.e., the portion of the bipolar plate that interfacially contacts the electrode) but not in the flow channels. In some embodiments, the electrically conductive adhesive can be further modified compositionally to preclude creep into the flow channels. In other embodiments, a contact adhesive, such as in the form of a decal, can be applied to a bipolar plate such that the flow channels therein are not substantially obscured by the decal.

In alternative embodiments, a contact adhesive in the form of a decal can be applied to a surface of an electrode and then contacted with a bipolar plate. Alignment of the flow channels in the bipolar plate with the decal can be performed. Other contact adhesives can be used similarly.

In still other embodiments, at least one of the first electrode and the second electrode can be in the form of a prepreg of the electrically conductive adhesive, which can then be contacted with the corresponding bipolar plate in a manner similar to that described above.

In some more specific embodiments, an epoxy can be applied to the perimeter of the bipolar plate, and the epoxy-coated bipolar plate can then be contacted with an electrode. The contact pressure and curing temperature can be tailored to control the extent of infiltration of the electrically conductive adhesive into the electrode. Suitable deposition techniques can include via an automated syringe pump apparatus.

In other more specific embodiments, an epoxy can be applied directly to an electrode, with the application temperature, pressure and time being used to control the extent of penetration into the electrode porosity. Optionally, masking techniques can be used in conjunction with the application process. Vacuum coating and slot die coating techniques can be used similarly for applying the electrically conductive adhesive to the electrode.

In still other embodiments, the electrically conductive adhesive can be an epoxy. In more specific embodiments, the epoxy can be a two-part epoxy. Suitable examples of self-curing and two-part epoxies are described above. In some embodiments, a first part of the two-part epoxy can be applied to at least one of the first electrode and the second electrode, and a second part of the two-part epoxy can be applied to least one of the first bipolar plate and the second bipolar plate. After applying both parts of the two-part epoxy separately, the first part and the second part of the two-part epoxy can be contacted together with one another to form the interfacial adhesive bond. In other embodiments, both parts of the two-part epoxy can be applied together to either the bipolar plate or the electrode, with interfacial contact and curing taking place thereafter.

In still other embodiments, methods for applying the electrically conductive adhesive to the electrode(s) or the bipolar plate(s) can include filling at least a portion of the flow channels in the bipolar plate(s) with a water-soluble material before forming an interfacial adhesive bond. When the flow channels are filled with a water-soluble material, the electrically conductive adhesive can be applied to either the electrode(s) or the bipolar plate(s) without significant risk of the electrically conductive adhesive occluding the flow channels. After forming the interfacial adhesive bond, the methods can include removing the water-soluble material from the flow channels by circulating an aqueous liquid therethrough. The aqueous liquid used to remove the water-soluble material can be an aqueous electrolyte solution used during operation of the flow battery, or it can be another aqueous liquid entirely.

As indicated above, the various embodiments of the present disclosure can desirably decrease the incidence of parasitic reactions that occur within an electrochemical cell. More particularly, the embodiments of the present disclosure can provide a ratio of productive reactions to parasitic reactions at least exceeding 5 when the flow battery is in operation. Higher ratios of productive reactions to parasitic reactions can also be realized. In some embodiments, a ratio of productive reactions to parasitic reactions can be about 10 or above, or about 20 or above, or about 30 or above, or about 40 or above, or about 50 or above, or about 100 or above, or about 200 or above, or about 500 or above, or about 1000 or above. A suitable ratio of productive reactions to parasitic reactions can vary from application to application. Accordingly, the design of a given electrochemical cell can incorporate any number of the features described hereinabove to achieve a given ratio of productive reactions to parasitic reactions. A suitable ratio can be determined for a given application based upon optimizing current efficiency versus cell resistance. Similar considerations can apply to fabricating an electrochemical cell or flow battery having a desired degree of contact resistance.

In some embodiments, flow batteries of the present disclosure can include an active material in one or more electrolyte solutions that is a coordination complex. As used herein, the terms "coordination complex" and "coordination compound" refer to any compound having a metal bound to one or more ligands through a covalent bond. Due to their variable oxidation states, transition metals can be highly desirable for use within the active materials of a flow battery. Cycling between the accessible oxidation states can result in the conversion of chemical energy into electrical energy. Lanthanide metals can be used similarly in this regard in alternative embodiments. Particularly desirable transition metals for inclusion in a flow battery include, for example, Al, Cr, Ti and Fe. For purposes of the present disclosure, Al is to be considered a transition metal. In some embodiments, coordination complexes within a flow battery can include at least one catecholate or substituted catecholate ligand. Sulfonated or hydroxylated catecholate ligands can be particularly desirable ligands due to their ability to promote solubility of coordination complexes in which they are present.

Other ligands that can be present in coordination complexes, alone or in combination with one or more catecholate or substituted catecholate ligands, include, for example, ascorbate, citrate, glycolate, a polyol, gluconate, hydroxyalkanoate, acetate, formate, benzoate, malate, maleate, phthalate, sarcosinate, salicylate, oxalate, urea, polyamine, aminophenolate, acetylacetonate, and lactate. Where chemically feasible, it is to be recognized that such ligands can be optionally substituted with at least one group selected from among $C_{1-6}$ alkoxy, $C_{1-6}$ alkyl, $C_{1-6}$ alkenyl, $C_{1-6}$ alkynyl, 5- or 6-membered aryl or heteroaryl groups, a boronic acid or a derivative thereof, a carboxylic acid or a derivative thereof, cyano, halide, hydroxyl, nitro, sulfonate, a sulfonic acid or a derivative thereof, a phosphonate, a phosphonic acid or a derivative thereof, or a glycol, such as polyethylene glycol. Alkanoate includes any of the alpha, beta, and gamma forms of these ligands. Polyamines include, but are not limited to, ethylenediamine, ethylenediamine tetraacetic acid (EDTA), and diethylenetriamine pentaacetic acid (DTPA).

Other examples of ligands can be present include monodentate, bidentate, and/or tridentate ligands. Examples of monodentate ligands that can be present in a coordination complex include, for example, carbonyl or carbon monoxide, nitride, oxo, hydroxo, water, sulfide, thiols, pyridine, pyrazine, and the like. Examples of bidentate ligands that can be present in a coordination complex include, for example, bipyridine, bipyrazine, ethylenediamine, diols (including ethylene glycol), and the like. Examples of tridentate ligands that can be present a coordination complex include, for example, terpyridine, diethylenetriamine, triazacyclononane, tris(hydroxymethyl)aminomethane, and the like.

The active materials in a flow battery can be disposed in an aqueous electrolyte solution in which the active material is dissolved. As used herein, the term "aqueous electrolyte solution" refers to a homogeneous liquid phase with water as a predominant solvent in which an active material is at least partially solubilized, ideally fully solubilized. This definition encompasses both solutions in water and solutions containing a water-miscible organic solvent as a minority component of an aqueous phase.

Illustrative water-miscible organic solvents that can be present in an aqueous electrolyte solution include, for example, alcohols and glycols, optionally in the presence of one or more surfactants or other components discussed below. In more specific embodiments, an aqueous electrolyte solution can contain at least about 98% water by weight. In other more specific embodiments, an aqueous electrolyte solution can contain at least about 55% water by weight, or at least about 60% water by weight, or at least about 65% water by weight, or at least about 70% water by weight, or at least about 75% water by weight, or at least about 80% water by weight, or at least about 85% water by weight, or at least about 90% water by weight, or at least about 95% water by weight. In some embodiments, an aqueous electrolyte solution can be free of water-miscible organic solvents and consist of water alone as a solvent.

In further embodiments, an aqueous electrolyte solution can include a viscosity modifier, a wetting agent, or any combination thereof. Suitable viscosity modifiers can include, for example, corn starch, corn syrup, gelatin, glycerol, guar gum, pectin, and the like. Other suitable examples will be familiar to one having ordinary skill in the art. Suitable wetting agents can include, for example, various non-ionic surfactants and/or detergents. In some or other embodiments, an aqueous electrolyte solution can further include a glycol or a polyol. Suitable glycols can include, for example, ethylene glycol, diethylene glycol, and polyethylene glycol. Suitable polyols can include, for example, glycerol, mannitol, sorbitol, pentaerythritol, and tris(hydroxymethyl)aminomethane. Inclusion of any of these components in an aqueous electrolyte solution can help promote dissolution of a coordination complex or similar active material and/or reduce viscosity of the aqueous electrolyte solution for conveyance through a flow battery, for example.

In addition to a solvent and a coordination complex as an active material, an aqueous electrolyte solution can also include one or more mobile ions (i.e., an extraneous electrolyte). In some embodiments, suitable mobile ions can include proton, hydronium, or hydroxide. In other various embodiments, mobile ions other than proton, hydronium, or hydroxide can be present, either alone or in combination with proton, hydronium or hydroxide. Such alternative mobile ions can include, for example, alkali metal or alkaline earth metal cations (e.g., $Li^+$, $Na^+$, $K^+$, $Mg^{2+}$, $Ca^{2+}$ and $Sr^{2+}$) and halides (e.g., $F^-$, $Cl^-$, or $Br^-$). Other suitable mobile ions can include, for example, ammonium and tetraaklammonium ions, chalcogenides, phosphate, hydrogen phosphate, phosphonate, nitrate, sulfate, nitrite, sulfite, perchlorate, tetrafluoroborate, hexafluorophosphate, and any combination thereof. In some embodiments, less than about 50% of the mobile ions can constitute protons, hydronium, or hydroxide. In other various embodiments, less than about 40%, less than about 30%, less than about 20%, less than about 10%, less than about 5%, or less than about 2% of the mobile ions can constitute protons, hydronium, or hydroxide.

Flow batteries can provide sustained charge or discharge cycles of several hour durations. As such, they can be used to smooth energy supply/demand profiles and provide a mechanism for stabilizing intermittent power generation assets (e.g., from renewable energy sources such as solar and wind energy). It should be appreciated, then, that various embodiments of the present disclosure include energy storage applications where such long charge or discharge durations are desirable. For example, in non-limiting examples, the flow batteries of the present disclosure can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the flow batteries of the present disclosure can be used as power sources for remote camps, forward operating bases, off-grid telecommunications, remote sensors, the like, and any combination thereof. Further, while the disclosure herein is generally directed to flow batteries, it is to be appreciated that other electrochemical energy storage media can incorporate the electrolyte solutions and coordination complexes described herein, specifically those utilizing stationary electrolyte solutions.

In some embodiments, flow batteries can include: a first chamber containing a negative electrode contacting a first aqueous electrolyte solution; a second chamber containing a positive electrode contacting a second aqueous electrolyte solution, and a separator disposed between the first and second electrolyte solutions. The chambers provide separate reservoirs within the cell, through which the first and/or second electrolyte solutions circulate so as to contact the respective electrodes and the separator. Each chamber and its associated electrode and electrolyte solution define a corresponding half-cell. The separator provides several functions which include, for example, (1) serving as a barrier to mixing of the first and second electrolyte solutions, (2) electrically insulating to reduce or prevent short circuits between the positive and negative electrodes, and (3) to facilitate ion transport between the positive and negative electrolyte chambers, thereby balancing electron transport during charge and discharge cycles. The negative and positive electrodes provide a surface where electrochemical reactions can take place during charge and discharge cycles. During a charge or discharge cycle, electrolyte solutions can be transported from separate storage tanks through the corresponding chambers, as shown in FIG. 1. In a charging cycle, electrical power can be applied to the cell such that the active material contained in the second electrolyte solution undergoes a one or more electron oxidation and the active material in the first electrolyte solution undergoes a one or more electron reduction. Similarly, in a discharge cycle the second active material is reduced and the first active material is oxidized to generate electrical power.

The separator can be a porous membrane in some embodiments and/or an ionomer membrane in other various embodiments. In some embodiments, the separator can be formed from an ionically conductive polymer. Regardless of its type, the separator or membrane can be ionically conductive toward various ions.

Polymer membranes can be anion- or cation-conducting electrolytes. Where described as an "ionomer," the term refers to polymer membrane containing both electrically neutral repeating units and ionized repeating units, where the ionized repeating units are pendant and covalently bonded to the polymer backbone. In general, the fraction of ionized units can range from about 1 mole percent to about 90 mole percent. For example, in some embodiments, the content of ionized units is less than about 15 mole percent; and in other embodiments, the ionic content is higher, such as greater than about 80 mole percent. In still other embodiments, the ionic content is defined by an intermediate range, for example, in a range of about 15 to about 80 mole percent. Ionized repeating units in an ionomer can include anionic functional groups such as sulfonate, carboxylate, and the like. These functional groups can be charge balanced by, mono-, di-, or higher-valent cations, such as alkali or alkaline earth metals. Ionomers can also include polymer compositions containing attached or embedded quaternary ammonium, sulfonium, phosphazenium, and guanidinium residues or salts. Suitable examples will be familiar to one having ordinary skill in the art.

In some embodiments, polymers useful as a separator can include highly fluorinated or perfluorinated polymer backbones. Certain polymers useful in the present disclosure can include copolymers of tetrafluoroethylene and one or more fluorinated, acid-functional co-monomers, which are commercially available as NAFION™ perfluorinated polymer electrolytes from DuPont. Other useful perfluorinated polymers can include copolymers of tetrafluoroethylene and $FSO_2$—$CF_2CF_2CF_2CF_2$—O—$CF$=$CF_2$, FLEMION™ and SELEMION™.

Additionally, substantially non-fluorinated membranes that are modified with sulfonic acid groups (or cation exchanged sulfonate groups) can also be used. Such membranes can include those with substantially aromatic backbones such as, for example, polystyrene, polyphenylene, biphenyl sulfone, (BPSH), or thermoplastics such as polyetherketones and polyethersulfones.

Battery-separator style porous membranes, can also be used as the separator. Because they contain no inherent ionic conduction capabilities, such membranes are typically impregnated with additives in order to function. These membranes typically contain a mixture of a polymer and inorganic filler, and open porosity. Suitable polymers can include, for example, high density polyethylene, polypropylene, polyvinylidene difluoride (PVDF), or polytetrafluoroethylene (PTFE). Suitable inorganic fillers can include silicon carbide matrix material, titanium dioxide, silicon dioxide, zinc phosphide, and ceria.

Separators can also be formed from polyesters, polyetherketones, poly(vinyl chloride), vinyl polymers, and substituted vinyl polymers. These can be used alone or in combination with any previously described polymer.

Porous separators are non-conductive membranes which allow charge transfer between two electrodes via open channels filled with electrolyte. The permeability increases the probability of active materials passing through the separator from one electrode to another and causing cross-contamination and/or reduction in cell energy efficiency. The degree of this cross-contamination can depend on, among other features, the size (the effective diameter and channel length), and character (hydrophobicity/hydrophilicity) of the pores, the nature of the electrolyte, and the degree of wetting between the pores and the electrolyte.

The pore size distribution of a porous separator is generally sufficient to substantially prevent the crossover of active materials between the two electrolyte solutions. Suitable porous membranes can have an average pore size distribution of between about 0.001 nm and 20 micrometers, more typically between about 0.001 nm and 100 nm. The size distribution of the pores in the porous membrane can be substantial. In other words, a porous membrane can contain a first plurality of pores with a very small diameter (approximately less than 1 nm) and a second plurality of pores with a very large diameter (approximately greater than 10 micrometers). The larger pore sizes can lead to a higher amount of active material crossover. The ability for a porous membrane to substantially prevent the crossover of active materials can depend on the relative difference in size between the average pore size and the active material. For example, when the active material is a metal center in a coordination complex, the average diameter of the coordination complex can be about 50% greater than the average pore size of the porous membrane. On the other hand, if a porous membrane has substantially uniform pore sizes, the average diameter of the coordination complex can be about 20% larger than the average pore size of the porous membrane. Likewise, the average diameter of a coordination complex is increased when it is further coordinated with at least one water molecule. The diameter of a coordination complex of at least one water molecule is generally considered to be the hydrodynamic diameter. In such embodiments, the hydrodynamic diameter is generally at least about 35% greater than the average pore size. When the average pore size is substantially uniform, the hydrodynamic radius can be about 10% greater than the average pore size.

In some embodiments, the separator can also include reinforcement materials for greater stability. Suitable reinforcement materials can include nylon, cotton, polyesters, crystalline silica, crystalline titania, amorphous silica, amorphous titania, rubber, asbestos, wood or any combination thereof.

Separators within the flow batteries of the present disclosure can have a membrane thickness of less than about 500 micrometers, or less than about 300 micrometers, or less than about 250 micrometers, or less than about 200 micrometers, or less than about 100 micrometers, or less than about 75 micrometers, or less than about 50 micrometers, or less than about 30 micrometers, or less than about 25 micrometers, or less than about 20 micrometers, or less than about 15 micrometers, or less than about 10 micrometers. Suitable separators can include those in which the flow battery is capable of operating with a current efficiency of greater than about 85% with a current density of 100 mA/cm$^2$ when the separator has a thickness of 100 micrometers. In further embodiments, the flow battery is capable of operating at a current efficiency of greater than 99.5% when the separator has a thickness of less than about 50 micrometers, a current efficiency of greater than 99% when the separator has a thickness of less than about 25 micrometers, and a current efficiency of greater than 98% when the separator has a thickness of less than about 10 micrometers. Accordingly, suitable separators include those in which the flow battery is capable of operating at a voltage efficiency of greater than 60% with a current density of 100 mA/cm$^2$. In further embodiments, suitable separators can include those in which the flow battery is capable of operating at a voltage efficiency of greater than 70%, greater than 80% or even greater than 90%.

The diffusion rate of the first and second active materials through the separator can be less than about $1\times10^{-5}$ mol cm$^{-2}$ day$^{-1}$, or less than about $1\times10^{-6}$ mol cm$^{-2}$ day$^{-1}$, or less than about $1\times10^{-7}$ mol cm$^{-2}$ day$^{-1}$, or less than about $1\times10^{-9}$ mol cm$^{-2}$ day$^{-1}$, or less than about $1\times10^{-11}$ mol cm$^{-2}$ day$^{-1}$, or less than about $1\times10^{-13}$ mol cm$^{-2}$ day$^{-1}$, or less than about $1\times10^{-15}$ mol cm$^{-2}$ day$^{-1}$.

The flow batteries can also include an external electrical circuit in electrical communication with the first and second electrodes. The circuit can charge and discharge the flow battery during operation. Reference to the sign of the net ionic charge of the first, second, or both active materials relates to the sign of the net ionic charge in both oxidized and reduced forms of the redox active materials under the conditions of the operating flow battery. Further exemplary embodiments of a flow battery provide that (a) the first active material has an associated net positive or negative charge and is capable of providing an oxidized or reduced form over an electric potential in a range of the negative operating potential of the system, such that the resulting oxidized or reduced form of the first active material has the same charge sign (positive or negative) as the first active material and the ionomer membrane also has a net ionic charge of the same sign; and (b) the second active material has an associated net positive or negative charge and is capable of providing an oxidized or reduced form over an electric potential in a range of the positive operating potential of the system, such that the resulting oxidized or reduced form of the second active material has the same charge sign (positive or negative sign) as the second active material and the ionomer membrane also has a net ionic charge of the same sign; or both (a) and (b). The matching charges of the first and/or second active materials and the ionomer membrane can provide a high selectivity. More specifically, charge matching can provide less than about 3%; less than about 2%, less than about 1%, less than about 0.5%, less than about 0.2%, or less than about 0.1% of the molar flux of ions passing through the ionomer membrane as being attributable to the first or second active material. The term "molar flux of ions" refers to the amount of ions passing through the ionomer membrane, balancing the charge associated with the flow of external electricity/electrons. That is, the flow battery is capable of operating or operates with the substantial exclusion of the active materials by the ionomer membrane; and such exclusion can be promoted through charge matching.

Flow batteries of the present disclosure can have one or more of the following operating characteristics: (a) where, during the operation of the flow battery, the first or second active materials comprise less than about 3% of the molar flux of ions passing through the ionomer membrane; (b) where the round trip current efficiency is greater than about 70%, greater than about 80%, or greater than about 90%; (c) where the round trip current efficiency is greater than about 90%; (d) where the sign of the net ionic charge of the first, second, or both active materials is the same in both oxidized and reduced forms of the active materials and matches that of the ionomer membrane; (e) where the ionomer membrane has a thickness of less than about 100 µm, less than about 75 µm, less than about 50 µm, or less than about 250 µm; (1) where the flow battery is capable of operating at a current density of greater than about 100 mA/cm$^2$ with a round trip voltage efficiency of greater than about 60%; and (g) where the energy density of the electrolyte solutions is greater than about 10 Wh/L, greater than about 20 Wh/L, or greater than about 30 Wh/L.

In some cases, a user may desire to provide higher charge or discharge voltages than available from a single electrochemical cell. In such cases, several battery cells can be connected in series such that the voltage of each cell is additive. This forms a bipolar stack; also referred to as an electrochemical stack. As discussed herein, a bipolar plate can be employed to connect adjacent electrochemical cells in a bipolar stack, which allows for electron transport to take place but prevents fluid or gas transport between adjacent cells. The positive electrode compartments and negative electrode compartments of individual cells can be fluidically connected via common positive and negative fluid manifolds in the bipolar stack. In this way, individual cells can be stacked in series to yield a voltage appropriate for DC applications or conversion to AC applications.

In additional embodiments, the cells, bipolar stacks, or batteries can be incorporated into larger energy storage systems, suitably including piping and controls useful for operation of these large units. Piping, control, and other equipment suitable for such systems are known in the art, and can include, for example, piping and pumps in fluid communication with the respective chambers for moving electrolyte solutions into and out of the respective chambers and storage tanks for holding charged and discharged electrolytes. The cells, cell stacks, and batteries of this disclosure can also include an operation management system. The operation management system can be any suitable controller device, such as a computer or microprocessor, and can contain logic circuitry that sets operation of any of the various valves, pumps, circulation loops, and the like.

In more specific embodiments, a flow battery system can include a flow battery (including a cell or cell stack); storage tanks and piping for containing and transporting the electrolyte solutions; control hardware and software which may include safety systems); and a power conditioning unit. The flow battery cell stack accomplishes the conversion of charging and discharging cycles and determines the peak power. The storage tanks contain the positive and negative active materials, such as the coordination complexes disclosed herein, and the tank volume determines the quantity of energy stored in the system. The control software, hardware, and optional safety systems suitably include sensors, mitigation equipment and other electronic/hardware controls and safeguards to ensure safe, autonomous, and efficient operation of the flow battery system. A power conditioning unit can be used at the front end of the energy storage system to convert incoming and outgoing power to a voltage and current that is optimal for the energy storage system or the application. For the example of an energy storage system connected to an electrical grid, in a charging cycle the power conditioning unit can convert incoming AC electricity into DC electricity at an appropriate voltage and current for the cell stack. In a discharging cycle, the stack produces DC electrical power and the power conditioning unit converts it to AC electrical power at the appropriate voltage and frequency for grid applications.

Where not otherwise defined hereinabove or understood by one having ordinary skill in the art, the definitions in the following paragraphs will be applicable to the present disclosure.

As used herein, the term "energy density" refers to the amount of energy that can be stored, per unit volume, in the active materials. Energy density refers to the theoretical energy density of energy storage and can be calculated by Equation 1:

$$\text{Energy density} = (26.8 \text{ A-h/mol}) \times OCV \times [e^-] \quad (1)$$

where OCV is the open circuit potential at 50% state of charge, (26.8 A-h/mol) is Faraday's constant, and $[e^+]$ is the concentration of electrons stored in the active material at 99% state of charge. In the case that the active materials largely are an atomic or molecular species for both the positive and negative electrolyte, $[e^-]$ can be calculated by Equation 2 as:

$$[e^-] = [\text{active materials}] \times N/2 \quad (2)$$

where [active materials] is the molar concentration of the active material in either the negative or positive electrolyte, whichever is lower, and N is the number of electrons transferred per molecule of active material. The related term "charge density" refers to the total amount of charge that each electrolyte contains. For a given electrolyte, the charge density can be calculated by Equation 3

$$\text{Charge density} = (26.8 \text{ A-h/mol}) \times [\text{active material}] \times N \quad (3)$$

where [active material] and n are as defined above.

As used herein, the term "current density" refers to the total current passed in an electrochemical cell divided by the geometric area of the electrodes of the cell and is commonly reported in units of mA/cm².

As used herein, the term "current efficiency" ($I_{eff}$) is the ratio of the total charge produced upon discharge of a cell to the total charge passed during charging. The current efficiency can be a function of the state of charge of the flow battery. In some non-limiting embodiments, the current efficiency can be evaluated over a state of charge range of about 35% to about 60%.

As used herein, the term "voltage efficiency" is the ratio of the observed electrode potential, at a given current density, to the half-cell potential for that electrode (×100%). Voltage efficiencies can be described for a battery charging step, a discharging step, or a "round trip voltage efficiency." The round trip voltage efficiency ($V_{eff,RT}$) at a given current density can be calculated from the cell voltage at discharge ($V_{discharge}$) and the voltage at charge ($V_{charge}$) using Equation 4:

$$V_{eff,RT} = V_{discharge}/V_{charge} \times 100\% \quad (4)$$

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to a reversible hydrogen electrode. The negative electrode is associated with a first electrolyte solution and the positive electrode is associated with a second electrolyte solution, as described herein. The electrolyte solutions associated with the negative and positive electrodes may be described as negolytes and posolytes, respectively.

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate

What is claimed is the following:

1. An electrochemical cell comprising:
a first half-cell containing a first electrode in interfacial contact with a first bipolar plate, the first bipolar plate comprising a first set of flow channels that interface with the first electrode;
a second half-cell containing a second electrode in interfacial contact with a second bipolar plate, the second bipolar plate comprising a second set of flow channels that interface with the second electrode; and
a separator disposed between the first half-cell and the second half-cell;
wherein an electrically conductive adhesive interfacially bonds at least one of the first electrode to the first bipolar plate and the second electrode to the second bipolar plate, and fluid communication is maintained between the first electrode and the first bipolar plate and between the second electrode and the second bipolar plate,
wherein at least one of the adhesively bonded interfaces between the first set of flow channels and the first electrode or the interface between the second set of flow channels and the second electrode are substantially free of the electrically conductive adhesive.

2. The electrochemical cell of claim 1, wherein the first electrode is interfacially bonded to the first bipolar plate and the second electrode is interfacially bonded to the second bipolar plate.

3. The electrochemical cell of claim 1, wherein the electrically conductive adhesive comprises a contact adhesive that has been applied on a surface of any of the first electrode, the second electrode, the first bipolar plate, and the second bipolar plate, before contacting the first and second electrode with the respective first and second bipolar plate.

4. The electrochemical cell of claim 3, wherein the electrically conductive adhesive comprises a pattern decal that has been applied to any of the first electrode, the second electrode, the first bipolar plate, and the second bipolar plate, before contacting the first and second electrode with the respective first and second bipolar plate.

5. The electrochemical cell of claim 1, wherein at least one of the first electrode and the second electrode comprises a patterned prepreg of the electrically conductive adhesive.

6. The electrochemical cell of claim 1, wherein the electrically conductive adhesive comprises an epoxy.

7. The electrochemical cell of claim 1, wherein at least one of the first electrode and the second electrode comprises a carbon cloth, fibrous carbon mat, or porous carbon foam that is interfacially bonded to the first bipolar plate or the second bipolar plate, respectively.

8. The electrochemical cell of claim 1, wherein each bipolar plate comprises a plurality of flow channels that establish fluid communication with the first electrode or the second electrode.

9. The electrochemical cell of claim 8, wherein the plurality of flow channels are interdigitated in at least one of the first bipolar plate and the second bipolar plate.

10. The electrochemical cell of claim 8, wherein the plurality of flow channels are substantially devoid of the electrically conductive adhesive.

11. The electrochemical cell of claim 1, wherein the electrically conductive adhesive comprises one or more surfactants.

12. A method of fabricating an electrochemical cell, the electrochemical cell comprising (i) a first half-cell containing a first electrode and a first bipolar plate having a first set of flow channels; (ii) a second half-cell containing a second electrode and a second bipolar plate having a second set of flow channels; and (iii) a separator disposed between the first half-cell and the second half-cell, the method comprising at least one of:
(1) forming a first interfacial bond between the first electrode and the first bipolar plate by:
(a) applying an electrically conductive adhesive to at least a portion of the first electrode and then contacting the first bipolar plate therewith to form the first interfacial bond; and/or
(b) applying an electrically conductive adhesive to at least a portion of the first bipolar plate and then contacting the first electrode therewith to form the first interfacial bond; and
(c) curing the electrically conductive adhesive;
such that the first set of flow channels interface with the first electrode and that interface is substantially devoid of the electrically conductive adhesive; and
(2) forming a second interfacial bond between the second electrode and the second bipolar plate by:
(a) applying an electrically conductive adhesive to at least a portion of the second electrode and then contacting the second bipolar plate therewith to form the second interfacial bond; or
(b) applying an electrically conductive adhesive to at least a portion of the second bipolar plate and then contacting the second electrode therewith to form the second interfacial bond; and
(c) curing the electrically conductive adhesive;
such that the second set of flow channels interface with the second electrode and that interface is substantially devoid of the electrically conductive adhesive;
wherein fluid communication is maintained between the first electrode and the first bipolar plate and between the second electrode and the second bipolar plate after interfacial adhesive bond formation.

13. The method of claim 12, wherein the first electrode is interfacially bonded to the first bipolar plate and the second electrode is interfacially bonded to the second bipolar plate.

14. The method of claim 12, comprising applying the electrically conductive adhesive to a portion of at least one of the first electrode and the second electrode, and then interfacially contacting the first bipolar plate or the second bipolar plate therewith.

15. The method of claim 12, comprising applying the electrically conductive adhesive to a portion of at least one of the first bipolar plate and the second bipolar plate, and then interfacially contacting the first electrode or the second electrode therewith.

16. The method of claim 12, wherein the electrically conductive adhesive comprises a contact adhesive disposed on a surface of any of the first electrode, the second electrode, the first bipolar plate, and the second bipolar plate.

17. The method of claim 16, wherein the electrically conductive adhesive comprises a patterned decal applied to any of the first electrode, the second electrode, the first bipolar plate, or the second bipolar plate.

18. The method of claim 12, wherein at least one of the first electrode and the second electrode comprises a patterned prepreg of the electrically conductive adhesive.

19. The method of claim 12, wherein the electrically conductive adhesive comprises patterned epoxy layer.

20. The method of claim 19, wherein the electrically conductive adhesive comprises a two-part epoxy.

21. The method of claim 20, comprising:
applying a first part of the two-part epoxy to at least one of the first electrode and the second electrode, and a second part of the two-part epoxy to at least one of the first bipolar plate and the second bipolar plate; and
contacting the first part and the second part of the two-part epoxy together with one another to form the interfacial adhesive bond.

22. The method of claim 12, wherein at least one of the first electrode and the second electrode comprises a carbon cloth that is interfacially bonded to the first bipolar plate or the second bipolar plate.

23. The method of claim 12, wherein each bipolar plate comprises a plurality of flow channels that establish fluid communication with the first electrode or the second electrode and are substantially devoid of the electrically conductive adhesive.

24. The method of claim 23, wherein the plurality of flow channels are interdigitated in at least one of the first bipolar plate and the second bipolar plate.

25. The method of claim 23, further comprising:
filling at least a portion of the plurality of flow channels with a water-soluble material before forming an interfacial adhesive bond; and
removing the water-soluble material after forming the interfacial adhesive bond.

26. The method of claim 12, further comprising connecting a plurality of the electrochemical cells in series with one another in an electrochemical stack.

27. A method comprising:
(a) providing a flow battery having an electrochemical cell comprising:
a first half-cell containing a first electrode in interfacial contact with a first bipolar plate;
a second half-cell containing a second electrode in interfacial contact with a second bipolar plate; and a separator disposed between the first half-cell and the second half-cell;
wherein an electrically conductive adhesive interfacially bonds at least one of the first electrode to the first bipolar plate and the second electrode to the second bipolar plate, and fluid communication is maintained between the first electrode and the first bipolar plate and between the second electrode and the second bipolar plate; and
(b) circulating a first electrolyte solution through the first half-cell and a second electrolyte solution through the second half-cell;
wherein convective flow of at least one of the first electrolyte solution and the second electrolyte solution occurs preferentially in a region of the first electrode or the second electrode opposite an interfacial adhesive bond formed with the electrically conductive adhesive,
wherein at least a portion of the electrically conductive adhesive penetrates into pores defined in the first electrode or the second electrode, and the at least one of the first electrode and the second electrode is denser in proximity to an interface with the bipolar plate than other locations of the first or second electrodes.

28. The electrochemical cell of claim 1, wherein at least a portion of the electrically conductive adhesive has penetrated into pores defined in the first electrode or the second electrode, and the at least one of the first electrode and the second electrode is denser in proximity to an interface with the bipolar plate than other locations of the first or second electrodes.

29. The electrochemical cell of claim 7, wherein the porosity of at least one of the first or second electrode is at least 80% of the porosity of the corresponding first or second electrode in an uncompressed state.

30. The method of claim 12, wherein the contacting comprises applying pressure.

31. The method of claim 30, wherein the applied pressure results in the compaction of the carbon cloth, fibrous carbon mat, or carbon foam by less than 20%.

32. The method of claim 12, wherein the contacting results in at least a portion of the electrically conductive adhesive penetrating pores of the carbon cloth, fibrous carbon mat, or carbon foam, such that the density of the carbon cloth, fibrous carbon mat, or carbon foam is greater immediately proximate to the bipolar plate than the bulk of the electrode.

33. A flow battery comprising an electrochemical cell of claim 1.

* * * * *